Dec. 9, 1958 — F. RINGS — 2,863,317
CONCENTRIC INLET AND OUTLET CASINGS FOR WATER METERS AND THE LIKE
Filed July 28, 1954 — 2 Sheets-Sheet 1

INVENTOR.
Franz Rings

INVENTOR.
Franz Rings
BY Jones, Darby & Roberson
Att'ys.

United States Patent Office 2,863,317
Patented Dec. 9, 1958

2,863,317

CONCENTRIC INLET AND OUTLET CASINGS FOR WATER METERS AND THE LIKE

Franz Rings, Nahne, near Osnabruck, Germany, assignor to G. Kromachrode Aktiengesellschaft, Nahne, near Osnabruck, Germany Application July 28, 1954, Serial No. 446,207

Claims priority, application Germany May 7, 1953

2 Claims. (Cl. 73—201)

This invention relates to an improvement in or modification of the invention described and claimed in the specification of my co-pending application Pipe Line Adapter, Ser. No. 382,915, filed August 17, 1953, and is a continuation-in-part thereof.

In the specification of the said co-pending application is described a pipe line connector piece which is inserted into the supply and discharge pipes and in which the supply and discharge conduits lie concentrically within one another. Such a pipe line connector piece is suitable for various through-flow devices, for example meters, regulators, filters and the like provided the through-flow devices to be connected to it are so constructed that the inlet and outlet openings lie concentrically within one another.

The present invention has the basic problem of developing a fluid handling device, and in particular an annular piston water meter, in such a manner that it can be connected without any substantial alteration of its construction particularly of its metering mechanism, and without any additional intermediate pieces to such a pipe line connector piece provided with a double connector socket. According to the invention this is attained in that an inner casing which is provided with an axial inlet opening is concentrically accommodated in an outer casing in such a manner that between the walls of the casing a mantle-shaped outlet conduit is formed which issues concentrically to the inlet opening. The use of such a double walled casing consisting of an inner and an outer casing makes it possible to insert the meter mechanism of a water meter unaltered into the inner casing, which is open on top, so that the water flows to the meter mechanism through the axial inlet opening of the inner casing, and flows off from the meter mechanism through the mantle shaped outlet conduit. Moreover the inner casing can be closed on top by a regulating or positive valve employing the top of the casing as a valve seat. In all these cases a simple construction of the casing components of the through flow device, symmetrical about an axis of rotation, is attained, and sufficient cross section areas for the flow through can be provided without difficulties.

Conveniently the outer casing is provided with a screw socket projecting beyond the common sealing face of the inlet and outlet opening, so that the fluid handling device can be screwed directly on to the double connector socket of the connector piece. Frequently it is however, necessary to be able to screw the fluid handling device with any desired orientation on to the double connector socket. In such a case a cap nut can be provided on the outer casing, which serves for the screw connection with the connector piece. Alternatively the screw connection of the outer casing with the connector socket of the connector piece can be effected by means of an adaptor containing both left and right hand threads.

The invention will be explained more in detail hereinafter with reference to some embodiments illustrated by way of example in Figures 1 to 5.

Figure 1:
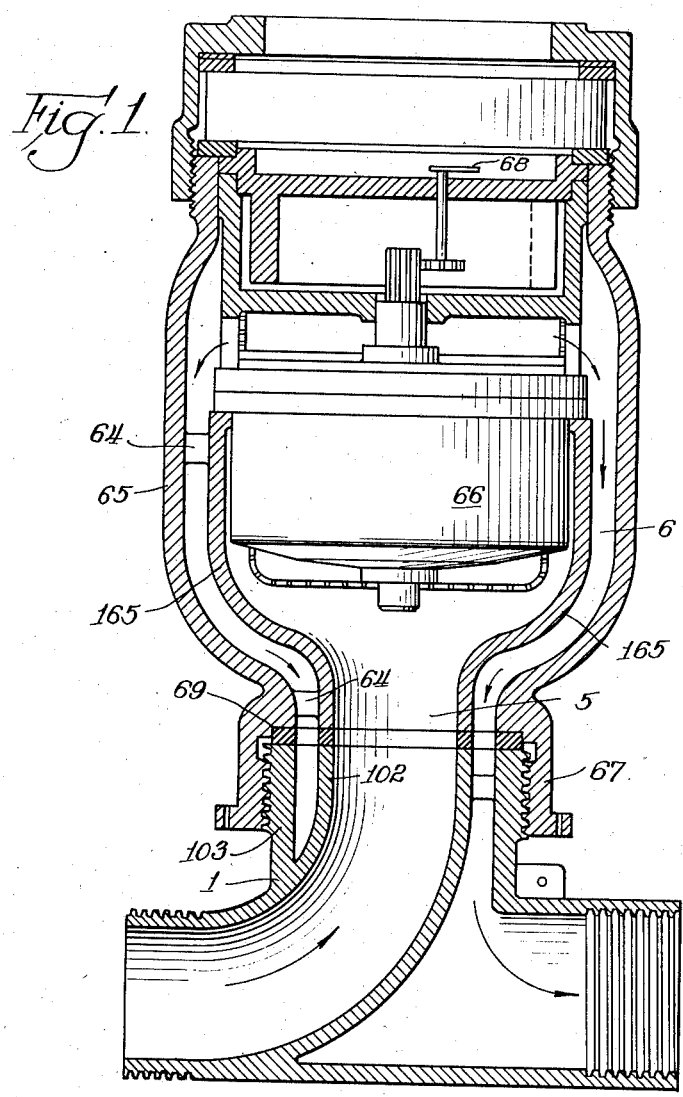
Figure 1 shows a section through an annular piston water meter.

A pipe line connector piece 1, which is built into the supply and discharge pipe, has a double connector socket in which the supply and discharge conduits lie concentrically within one another. To the pipe line connector piece 1 an annular piston water meter is connected which has an outer casing 65 and an inner casing 165 centered therein by suitable spacer or bridge members 64. Into the inner casing 165, which is provided with an axial inlet opening 5, the meter mechanism 66 of the meter is inserted. Between the walls of the casing 165, 65 a mantle shaped outlet conduit 6 is formed, which issues concentrically to the inlet opening 5. The outer casing 65 is provided with a screw socket 67, which projects beyond the plane of the members forming the common sealing face of the inlet (5) and outlet (6) conduits, carrying a packing ring 69. The outer casing 65 is screwed on to the connector piece (1) by the aid of the screw socket 67. The water then enters through the inlet opening 5 into the inner casing 165, flows through the inserted meter mechanism 66, and flows off through the mantle shaped outlet conduit 6 and the connector piece 1.

Figure 2:
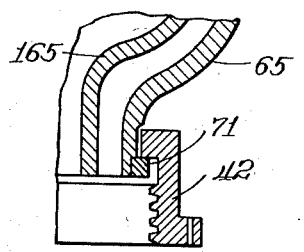
Figures 2 and 3 show various kinds of screw connections.
Figure 3:
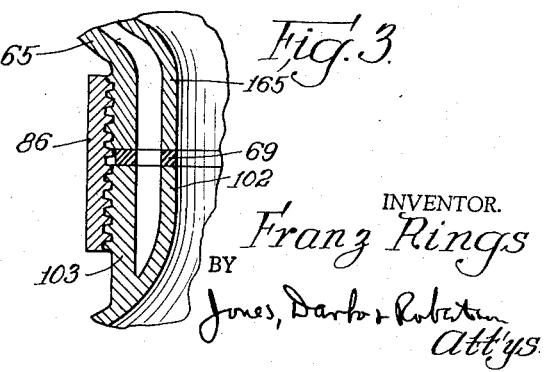

When it is desired to connect the water meter in such a manner that the hands and the dial 68 may be arranged with a predetermined orientation in which they can be read comfortably, then a ring nut 42 can be mounted on a ring 71 on the outer casing 65, as illustrated in Figure 2, which cap nut serves for the screw connection. However the same object can be attained alternatively according to Figure 3 by means of a screw coupling 86, which has a left hand thread adapted to be screwed on to the connector piece 1 and a right hand thread adapted to be screwed on to the outer casing 65. The casing portions 65 and 165 are symmetrical about an axis of rotation, and accordingly can be easily manufactured and machined.

Figure 4:
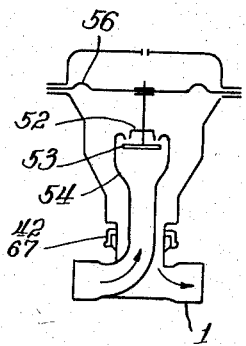
Figures 4 and 5 show diagrammatically the construction of gas pressure regulators.

Figure 4 shows diagrammatically a simple gas pressure regulator which is screwed on to the connector piece 1 by means of a screw socket 67 or of a ring nut 42. The gas pressure regulator has an inner casing 54 with an axial inlet, and an outer casing 50 arranged concentrically thereto. The inner casing 54 is adapted to be closed on top by a regulating valve 53 which together with the valve seat 52 forms a regulated cross section. The regulating valve is controlled in the usual manner by a membrane 56 closing the outer casing 50.

Figure 5:
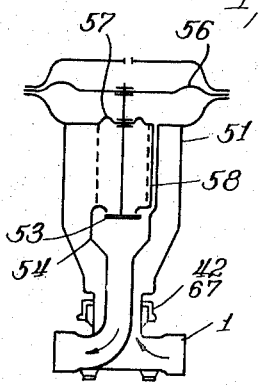

Figure 5 diagrammatically shows a gas pressure regulator with compensating membrane 57, in which the gas flows into the mantle shaped space between the inner casing 54' and outer casing 51, and flows off through the inner casing 54' after having passed through the control valve 53. Through a conduit 58 of the inner casing the back pressure is passed under the working membrane 56.

Figure 6:
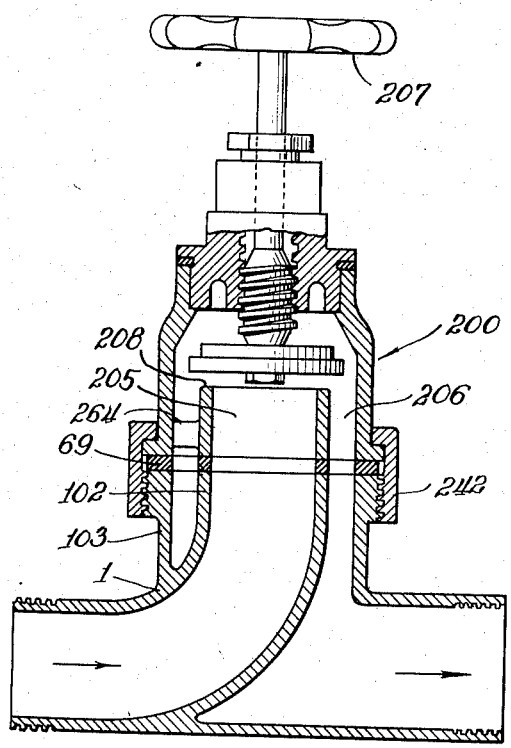

When instead of the regulating valve 53 a manually operable screw down valve is provided, an obturator member with inlet and outlet lying concentrically within one another is obtained which can be connected to the pipe line connector piece 1 in a like manner. Such a valve 200 is shown in Fig. 6. A short tubular element 205 supported from the valve housing by bridge elements 264 forms the inlet passageway. The lower open end forms a sealing face coplanar with the sealing face of the housing and forming a connection with inner element 102 of the connector piece 1, a gasket 69 being interposed and a threaded ring 242 clamping the housing of the valve to the outer snout 103 of the connector piece. The upper open end of tubular element 205 forms a valve seat 208 against which the valve closes when manipulated by means of handle 207.

What I claim is:

1. A fluid handling device comprising an integral generally cylindrical open-ended outer casing having a relatively large diameter upper portion and a relatively small diameter lower portion, a generally cylindrical open-ended inner casing arranged coaxially within said outer casing and spaced therefrom to form an annular passageway between said inner and outer casings and completely surrounding said inner casing, said inner casing having a relatively large diameter upper portion and terminating short of the top of said outer casing, supporting elements extending between said inner and outer casings providing the exclusive means of support for said inner housing, a fluid handling mechanism mounted within said inner casing at the upper end thereof and occupying the entire top opening of said inner casing, and a closure for the top of said outer casing, the lower extremities of said inner and outer casings having outwardly facing annular seats lying in a plane normal to the axis of said casings for abutting connection with a cooperating socket.

2. A fluid handling device in accordance with claim 1 wherein fluid handling mechanism is a water meter mechanism, said mechanism being seated upon the top of the inner casing and held in position by the closure for the outer casing, the size of said mechanism and the inside diameter of the upper portion of said outer casing being such that said mechanism may be inserted into and removed from the interior of said outer casing through the open top thereof.

References Cited in the file of this patent

UNITED STATES PATENTS

| | | |
|---|---|---|
| 587,125 | Kennedy | July 27, 1897 |
| 703,716 | Brown | July 1, 1902 |
| 940,239 | Dikkers | Nov. 16, 1909 |
| 1,464,385 | Hartzell | Aug. 7, 1923 |
| 1,729,820 | Campbell | Oct. 1, 1929 |
| 1,827,230 | Haase | Oct. 13, 1931 |
| 2,475,635 | Parsons | July 12, 1949 |
| 2,484,354 | O'Shaughnessy | Oct. 11, 1949 |
| 2,665,875 | MacGregor | Jan. 12, 1954 |

FOREIGN PATENTS

| | | |
|---|---|---|
| 102,441 | Austria | Jan. 25, 1926 |